Figure 1:
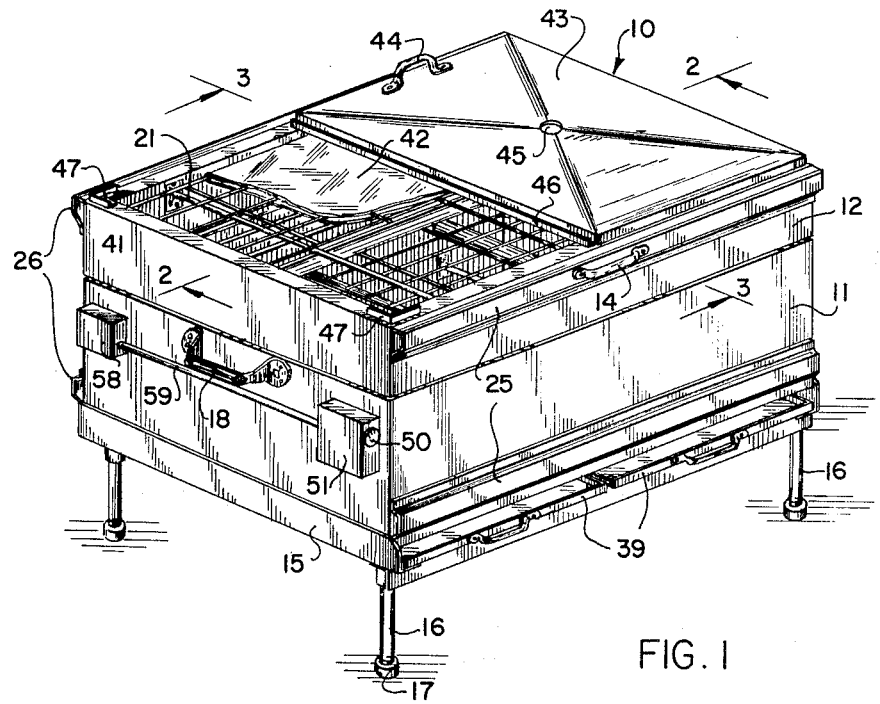

March 16, 1965   J. E. NUNNERY   3,173,357
BROILER
Filed Sept. 20, 1963   2 Sheets-Sheet 1

INVENTOR
JONATHAN E. NUNNERY

BY
ATTORNEY

March 16, 1965  J. E. NUNNERY  3,173,357
BROILER
Filed Sept. 20, 1963  2 Sheets-Sheet 2
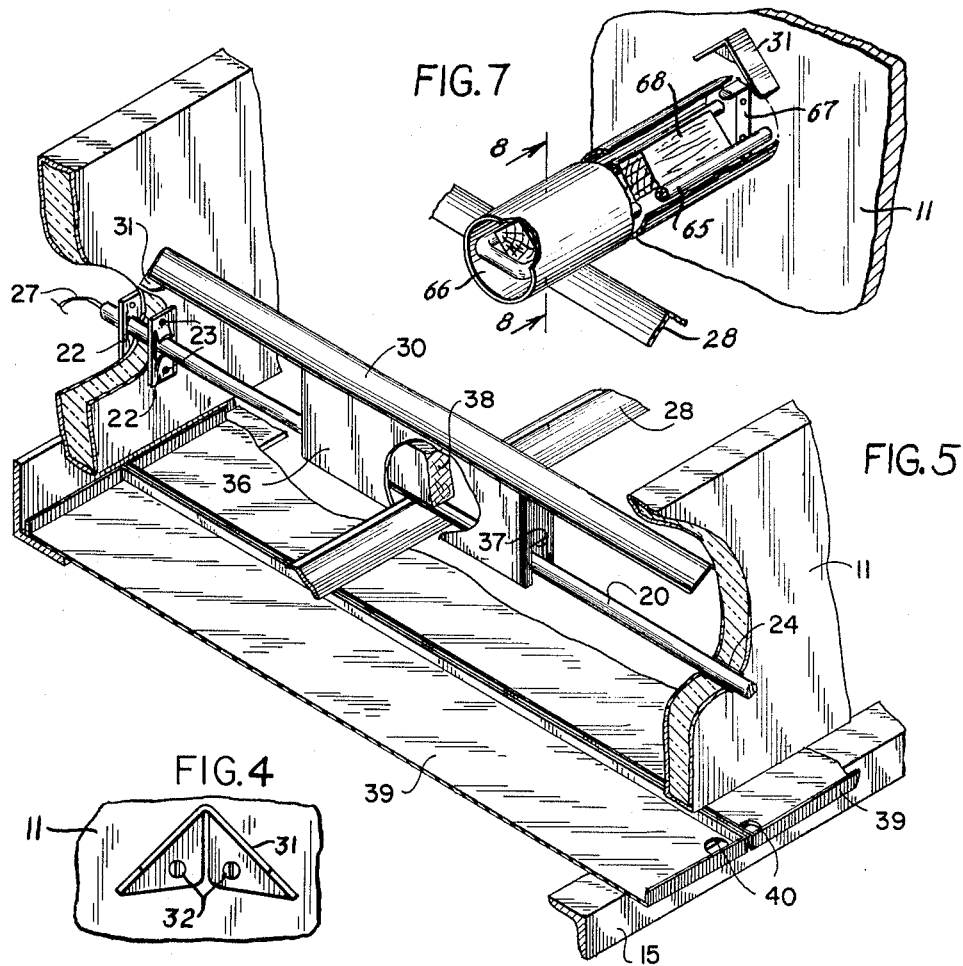
INVENTOR
JONATHAN E. NUNNERY
BY
*[signature]*
ATTORNEY

United States Patent Office 3,173,357
Patented Mar. 16, 1965

3,173,357
BROILER
Jonathan E. Nunnery, 1025 Dabney Drive,
Henderson, N.C.
Filed Sept. 20, 1963, Ser. No. 310,365
10 Claims. (Cl. 99—260)

This invention relates to the preparation of food for human consumption and to apparatus utilized for changing the state of the food from a raw to a palatable condition.

The invention relates particularly to apparatus utilized by commercial establishments in the cooking of meat or the like for consumption by the general public in a manner which will give expedient service as well as to impart an open-fire flavor.

In recent years the trend has been toward patio living with open-fire barbecue cooking using hickory or some other pungent wood as a heating means which would impart a flavor to the food. Many attempts have been made to capture this flavor, however, these efforts have not met with success and the wood itself has remained the only way to get the flavor.

With regard to the commercial aspect, the use of wood as a heating means has not proven satisfactory because of the time involved and the fact that the meat should be exposed to substantially constant heat. Charcoal has been used as a substitute for the wood and such charcoal would give a more constant heat over a longer period of time, however, the charcoal did not give off the hickory flavor and was subject to flare-ups of flame when grease from the meat would drop onto the hot charcoal. The objection to charcoal was partially overcome by the addition of hickory chips which would burn with the charcoal, however, the flare-up of flame is still objectionable and the charcoal would be consumed and more charcoal would have to be added which would cause uneven heat. Some attempts have been made to barbecue the meat electrically, however, grease falling on the electrical heating elements, likewise, would burn and leave a residue on the elements which would, in time, reduce the efficiency of the heating elements.

It is an object of the invention to provide a broiler for the preparation of food which will maintain a substantially constant heat and which is capable of imparting a hickory smoke flavor.

Another object of the invention is to provide a broiler for commercial use having electric heating elements for maintaining a substantially constant heat and having means for preventing contact between the grease of the meat being prepared and the electric heating elements.

A still further object of the invention is to provide a broiler with electric heating elements in which grease exuded by the meat will be collected and discharged from the broiler into a grease container for disposal.

A still further object of the invention is to provide a commercial broiler having heat disposed above and below the food being prepared.

Figures 2, 3:
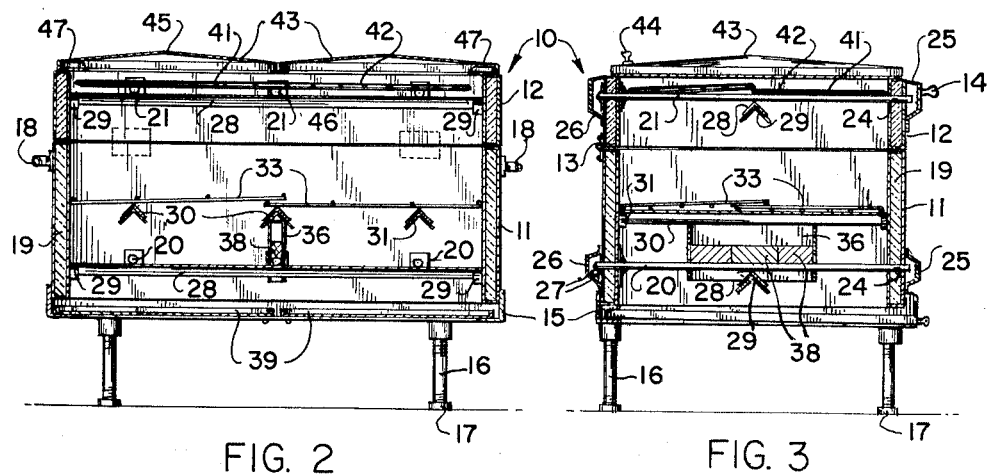

Other objects and advantages of the invention will be apparent from the following description taken in conjunction with the accompanying drawings in which:

FIG. 1 is a perspective of the present invention with certain parts removed and portions broken away for clarity;

FIG. 2, a longitudinal section taken along the line 2—2 of FIG. 1;

FIG. 3, a transverse section taken along the line 3—3 of FIG. 1;

FIG. 4, an enlarged side elevation of one of the shield mounting brackets;

FIG. 5, an enlarged detail perspective of one of the heating elements and its associated parts;

FIG. 6, a wiring diagram;

FIG. 7, a perspective of a modified form of smoke-producing apparatus; and

FIG. 8, a vertical section on the line 8—8 of FIG. 7.

Briefly stated the present invention is a commercial type broiler having electrical heating elements disposed above and below the food being cooked and having shields for preventing grease in the food from splattering or dripping onto the heating elements without interfering with the heating capacity of the elements. A rack for food such as meat is provided intermediate the upper and lower heating elements and, if desired, the elements above and below the food rack may be operated independently or simultaneously. The broiler includes upper and lower portions with insulated side walls hingedly connected together along one side so that meat or other products can be placed easily on the food rack and, if desired, a replaceable heat reflector may be located above the upper heating elements to reflect the heat downwardly onto the top of the meat and one or more drip pans may be disposed at the bottom of the housing to collect any drippings from the meat as well as to reflect the heat upwardly toward the underside of the meat. A container is provided for holding blocks of wood of hickory or the like with such blocks being in contact with at least one of the heating elements so that the block will smoke and impart a hickory flavor to the meat. If desired, a separate smoke-producing element may be provided which may be independently controlled to produce smoke only when desired.

With continued reference to the drawings a broiler 10 is provided including a lower housing 11 and an upper housing 12 connected together along one side by hinges 13. A handle 14 is mounted on the upper housing 12 on the side opposite the hinges 13 for manipulating such upper housing. The lower housing 11 is mounted on a frame or base 15 supported by legs 16 with adjustable feet 17. The broiler normally will be of a size to be installed permanently within a commercial food preparation establishment, however, such broiler may have a handle 18 mounted on opposite ends of the lower housing 11 for moving the broiler from place to place. The walls of the upper and lower housing forming a broiling compartment or chamber preferably are of double wall construction with insulating material 19 disposed between the walls to retard the transfer of heat and to maintain substantially constant temperature within the broiler 10.

A series of Calrod radiant heat elements or units 20 are provided in the lower housing 11 and a second series of Calrod radiant heat elements or units 21 are provided in the upper housing 12. The heating units of both the upper and lower housings are relatively widely spaced from each other for unimpeded heat flow therebetween and may be disposed substantially in alignment with each other as illustrated in FIG. 2 or such units may be in staggered relation with each other. As illustrated in FIGS. 3 and 5 one end of each of the heating units may be attached to one side wall by means of a pair of spring clips 22 mounted on such wall by fasteners 23 and the opposite end of each heating unit is slidably received within an opening 24 in the opposite wall. This construction permits the heating units to be firmly connected at one end and permits a slight lengthwise movement at the opposite end due to expansion and contraction.

In order to protect the operator of the broiler from coming into contact with the ends of the heating elements a pair of housings or channels 25 are mounted on the front of the broiler and form enclosures for the free ends of the heating units 20 and 21 and a second pair of channels 26 are mounted on the rear of the housings to provide enclosures for the fixed ends of such heating units. The channels 26 also serve as conduits for electrical conductors 27 which provide electrical energy to the heating units. If desired, at least one supporting member 28 is disposed lengthwise of each of the housings 11 and 12 beneath the heating units 20 and 21 and such member is adapted to support the intermediate portion of the heating units which tend to sag after the units become hot. The supporting members 28 rest upon brackets 29 fixed to the end walls of the housings 11 and 12 in such a manner that the supporting members are removable for cleaning.

In order to prevent grease from falling onto the lower heating elements a shield 30 is located above each of the heating elements and in spaced substantially non-heat conducting relation thereto. Each of the shields is substantially wider than the heating element so that any grease which is emitted by the meat will fall between the shields or will fall on such shields and will run downwardly by gravity to the lower edge where it will fall past the heating element. The shields are spaced in substantially non-heat conducting relation from the elements so as not to interfere with the radiant heat from the elements and are supported by mounting brackets 31 attached to the side walls of the lower housing 11 by fasteners 32 so that such shields may be easily removed for cleaning. The shields are adapted to removably support a rack or grill 33 which may be constructed of a plurality of segments to accommodate broilers of different sizes. The grill 33 supports the meat or other food being cooked and such grill is located substantially midway between the heating units 20 and 21 so that approximately the same amount of heat is applied to the top and to the bottom of the meat simultaneously.

If desired, a container 36 may be provided which is closed on both sides, at the ends and at the top and is open at the bottom only and such container is provided with recessed openings 37 in each end to accommodate one of the heating elements. The container 36, the top of which may be shaped to function as a grease deflector as indicated in FIG. 2, is adapted to receive a piece of wood such as hickory or the like 38 and is adapted to be mounted astride one of the heating elements and supported by the member 28. The upper end of the container is adapted to engage one of the shields 30 to retain the container in position. When the container is applied over one of the heating elements the wood 38 will gravitate to the bottom of the container and into contact with the heating element so that the heating element will cause the wood to burn, char or smolder and to give off smoke which will permeate the meat and add flavor thereto.

A pair of drip pans 39 are slidably received within the frame 15 and such pans are of a size to extend from a position beneath the walls of the lower housing 11 on three sides and into abutting relation with each other centrally of the housing. The pans 39 provide the dual function of reflecting heat upwardly toward the cooking area as well as receiving grease or other substance falling downwardly from the grill 33. Preferably, the pans 39 slope downwardly toward the front of the broiler and slope inwardly toward the center thereof. In order to discharge grease or other substance from the pans each of the pans has an opening 40 located in the front inner corner in such a manner that the grease is discharged from both pans into a common container (not shown).

In order to reflect heat downwardly from the upper heating units 21 a rack 41 is covered with disposable reflective material 42 such as aluminum foil or the like, and is placed on top of the upper heating elements to cause substantially all of the heat from such elements to be directed downwardly. The upper housing 12 is provided with a pair of cover members 43, each of which has a handle 44 and each of such cover members may have a vent opening 45. The cover members 43 are retained in position by a central channel 46 having upstanding flanges and corner brackets 47 with one of the flanges of the channel 46 and the corner brackets 47 of one end of the broiler being received within each of the cover members 43.

With reference to FIGS. 1 and 6 a dial mechanism 50 carried within a housing 51 is mounted on the lower housing 11 and such mechanism includes a motor 52 having a shaft 53 on which a cam 54 is mounted. The cam 54 engages a microswitch 55 connected by electrical lines 56 to a solenoid 57. The solenoid 57 is contained within a box 58 located adjacent to the rear of the broiler and connected to the housing 51 by a conduit 59 in which lines 56 are received. The solenoid 57 is connected to an electric switch 60 of mercury or other type which controls the supply of electrical energy through lines 61 and 62 to the lower heating elements 20. The lower heating elements are separated from the upper heating elements by a switch 63 so that the lower elements 20 may be operated independently of the upper elements 21.

With reference to FIGS. 7 and 8 a modified smoke producing apparatus is provided and includes a generally U-shaped heating element 65 mounted on the lower housing 11 and extending inwardly to a position overlying the support member 28. The arms of the heating element 65 are relatively close together and are generally parallel with each other. A sleeve or container 66, open at both ends, is disposed about the heating element 65 to prevent grease from falling onto such element. The sleeve 66 is mounted at one end on a spring clip 67 fixed to the housing 11 and the free end of such sleeve is supported by the member 28. If preferred, a bracket 31 may be mounted on the housing 11 to prevent grease from running down the side of the housing and onto the heating element 65 which would cause a flare-up of burning grease. A block of wood 68 is supported by the heating element 65 and such block is of a size to be contained within the sleeve or container 66.

The heating element 65 is connected to the electrical conductor 27 and has an electrical switch 69 convenient to the operator for controlling the flow of electrical energy to such heating element. When the heating element 65 is energized the wood 68 will smolder and the smoke therefrom will be discharged from the free end open of the sleeve 66. The sleeve 66 will get sufficiently hot so that any grease falling from the cooking meat will not remain on the sleeve but will fall by gravity therefrom into the drip pans below.

In the operation of the device electrical energy is supplied to the heating units after which the upper housing 12 is raised and meat or other foodstuff to be cooked is placed on the grill 33 and the upper housing is closed. The heating elements 20 and 21 disposed on opposite sides of the meat will cook the meat in a minimum of time. The grease which exudes from the cooking meat will fall by gravity into the drip pans 40 and such grease is prevented from falling onto the lower heating elements 20 by the shields 30.

If desired the container 36 may have one or more pieces of hickory wood or the like 38 placed therein and such container may be located over one of the heating elements so that the wood will smoke and impart a flavor to the meat.

It will be apparent that a relatively simple broiler having electric heating elements has been provided which will maintain a substantially constant heat and which has means for imparting a hickory smoke flavor to the meat being cooked.

It will be obvious to one skilled in the art that various changes may be made in the invention without departing from the spirit and scope thereof and therefore the invention is not limited by that which is illustrated in the

What is claimed is:
1. A broiler for cooking meat and the like comprising upper and lower housings hingedly connected together along one side to form a broiler compartment,
   a plurality of electric heating elements mounted in each of said housings and including a series of individual substantially horizontally spaced elongated heating elements,
   means for supporting said heating elements in fixed position,
   an individual shield removably located above and in substantially spaced non-heat conducting relation to each of said elongate heating elements in said lower housing to prevent drippings from the meat from falling thereon,
   said shield being substantially wider than said element,
   a grill located between said upper and lower heating elements,
   and means for maintaining a predetermined temperature within said broiler whereby said meat will be cooked in a minimum of time without being undesirably burned by a flare-up of flame from the heating elements.
2. The structure of claim 1 including
   container means for supporting wood in direct contact with at least one of said plurality of heating elements to cause wood smoke to be produced for imparting flavor to the meat.
3. The structure of claim 1
   wherein said upper housing includes a substantially horizontally disposed rack above said heating elements in said upper housing having removable heat reflective means thereon for reflecting heat toward said grill.
4. A broiler comprising upper and lower cooperative abutting broiler housings forming a chamber therebetween,
   a grill adapted for supporting substances developing drippings when subjected to heat mounted within said chamber between said housings,
   a plurality of electrical heating elements mounted in each of said upper and lower housings, at least said lower housing including individual elongated substantially rigid horizontally spaced heating elements in generally parallel relation to said grill and spaced therefrom a substantial distance in a manner to radiate heat onto substances supported on said grill,
   means for supplying electrical energy to said heating elements, individual shield means for preventing drippings from falling from the grill onto each of said elongated rigid heating elements while providing unimpeded upward heat flow passages therebetween, and means for mounting said individual shield means beneath said grill and in spaced substantially parallel non-heat conducting relation above each of said elongated rigid heating elements in said lower housing.
5. The structure of claim 4 having
   container means for supporting wood in engagement with at least one of said plurality of heating elements for producing smoke from the charring of the wood thereby.
6. A broiler for cooking meat or the like comprising
   a pair of insulated upper and lower housings hinged together in cooking cooperative relation to form a broiling compartment therebetween,
   a series of substantially parallel individual elongate rod-like electric heating elements mounted in substantially horizontally spaced parallel relation in each of said upper and lower housings,
   means for anchoring only one end of each of said rod-like heating elements to the respective housing to allow for variations in length under changing heat conditions,
   grease dripping shield means removably mounted in at least one of said housings and between said upper and lower heating elements,
   means for mounting each of said grease dripping shield means in substantially spaced and parallel non-heat conducting relation above each of the rod-like electric heating elements in said lower housing,
   each of said shield means being of such size and shape as to prevent grease dripping down into direct contact with the heating elements in said lower housing while simultaneously providing unimpeded vertical heat flow passages therebetween.
7. A broiler for cooking meat and the like comprising upper and lower housings hingedly connected together along one side to form a broiler compartment,
   a plurality of electric heating elements mounted in each of said housings and including a series of individual substantially horizontally spaced elongated heating elements,
   means for supporting said heating elements in fixed position,
   an individual shield removably located above and in substantially spaced non-heat conducting relation to each of said elongate heating elements in said lower housing to prevent drippings from the meat from falling thereon,
   said shield being substantially wider than said element,
   a grill located between said upper and lower heating elements,
   means for maintaining a predetermined temperature within said broiler whereby said meat will be cooked in a minimum of time without being undesirably burned by a flare-up of flame from the heating elements, and
   said plurality of heating elements including an independent generally U-shaped heating element mounted in said lower housing,
   a sleeve-like container disposed about said U-shaped heating element and adapted to contain wood for support by said U-shaped heating element for charring and smoke producing purposes,
   and switch means for controlling the flow of energy to said U-shaped heating element.
8. A broiler for cooking fat containing substances comprising upper and lower hingedly connected housings, supporting grill means removably mounted on said lower housing, a plurality of widely spaced electrical heating elements mounted in each of said housings in spaced relation to and on opposite sides of said grill means, an independent shield removably mounted intermediate said grill means and each of said heating element in the lower housing and in spaced substantially non-heat conducting relation therewith, said shields being substantially wider than said heating elements to prevent drippings from the fat containing substance from falling thereon but providing unimpeded upward heat flow passages therebetween, means for supplying electrical energy to said heating elements, and means for maintaining a predetermined temperature within said housings, whereby said substance will be cooked without flame or smoke from the drippings and said heating elements will remain clean.
9. In a food broiler having a grill with heating elements spaced above and below the same, an independent heating element mounted substantially horizontally within said broiler below said grill, a sleeve-like container disposed about said heating element and adapted to contain wood for smoke producing purposes and to prevent grease from falling onto said heating element, and means for controlling the flow of energy to said heating element whereby said wood smoke will impart flavor to the food being broiled.

10. In a food broiler having a grill with heating elements spaced relative thereto, an independent generally U-shaped heating element mounted substantially horizontally within said broiler below said grill, said U-shaped heating element adapted to support wood for smoke producing purposes, a sleeve-like container disposed about said independent heating element to prevent grease from falling thereon, and means for controlling the flow of energy to said independent heating element, whereby said wood smoke will impart flavor to the food being broiled.

References Cited by the Examiner

UNITED STATES PATENTS

| | | | |
|---|---|---|---|
| 2,174,079 | 9/39 | Dodson | 99—447 |
| 2,442,900 | 6/48 | McCormick | 219—35.4 |
| 2,772,882 | 11/55 | Wilson | 99—259 |
| 2,842,043 | 7/58 | Reuland | 99—259 |
| 2,856,502 | 10/58 | Wolf | 99—445 |
| 2,867,165 | 1/59 | Money | 99—446 |
| 2,874,631 | 2/59 | Cooksley | 99—400 |
| 2,898,846 | 8/59 | Del Francia | 99—444 |
| 2,905,077 | 9/59 | Del Francia | 99—446 |
| 2,906,191 | 9/59 | Lee | 99—259 |
| 2,917,988 | 12/59 | Harris | 99—327 |
| 2,924,693 | 2/60 | Ripley | 338—316 |
| 2,924,696 | 2/60 | Ommerman et al. | 219—35.4 |
| 3,052,177 | 9/62 | Lombardo | 99—390 |
| 3,108,173 | 10/63 | Berrett et al. | 99—390 |

ROBERT E. PULFREY, *Primary Examiner.*

LAWRENCE CHARLES, *Examiner.*